United States Patent [19]

Tsuneki

[11] Patent Number: 4,506,201
[45] Date of Patent: Mar. 19, 1985

[54] MICROPROCESSOR CONTROLLED PULSE MOTOR

[75] Inventor: Yukio Tsuneki, Hanno, Japan

[73] Assignee: Tokyo Shibaura Denki Kabushiki Kaisha, Kawasaki, Japan

[21] Appl. No.: 492,829

[22] Filed: May 9, 1983

[30] Foreign Application Priority Data

May 13, 1982 [JP] Japan .................................. 57-80516

[51] Int. Cl.³ .......................................... G05B 19/407
[52] U.S. Cl. .................................... 318/603; 318/254; 318/807; 364/183
[58] Field of Search ................... 318/254, 254 A, 138, 318/439, 327, 653, 603, 807; 364/183

[56] References Cited

U.S. PATENT DOCUMENTS

| | | | |
|---|---|---|---|
| 3,612,976 | 10/1971 | Tripp | 318/603 |
| 4,058,195 | 11/1977 | Fravel et al. | 364/900 X |
| 4,059,746 | 11/1977 | Haga | 318/603 X |
| 4,114,026 | 9/1978 | Fiorenza | 364/900 X |
| 4,147,967 | 4/1979 | Aiena | 318/603 X |
| 4,184,203 | 1/1980 | Skarvada | 364/565 X |
| 4,277,191 | 7/1981 | Davis et al. | 364/900 X |
| 4,290,116 | 9/1981 | Morse | 364/900 |
| 4,376,914 | 3/1983 | Kimura | 318/603 |
| 4,398,138 | 8/1983 | Kohzai et al. | 318/603 |

FOREIGN PATENT DOCUMENTS 0017011  1/1982  Japan .................................. 318/603

OTHER PUBLICATIONS

Machine Design, vol. 49, No. 1, Jan. 1977, pp. 70-74, Cleveland, U.S.A.
IBM Technical Disclosure Bulletin, vol. 24, No. 10, Mar. 1982, pp. 5215-5221, New York, U.S.A.

Primary Examiner—William M. Shoop
Assistant Examiner—Bentsu Ro
Attorney, Agent, or Firm—Cushman, Darby & Cushman

[57] ABSTRACT

A pulse motor control device is provided with a microprocessor for presetting time data in a counter to determine a rotating speed of a pulse motor according to an interrupt signal, in which an overflow pulse from the counter is supplied as an interrupt signal to the microprocessor and is also applied as a phase data changing signal, which determines the period of the phase data, to a motor control circuit. A gate is provided at a prestage of the interrupt terminal of the microprocessor. When the pulse motor is driven at a constant speed, the gate is disabled to prohibit the interrupt signal from being applied to the microprocessor.

6 Claims, 6 Drawing Figures

F I G. 3A 
F I G. 3B 
F I G. 3C 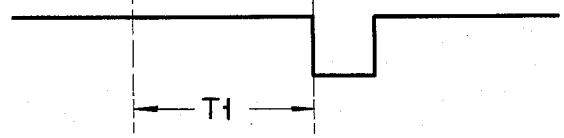
F I G. 4A 
F I G. 4B 
F I G. 4C 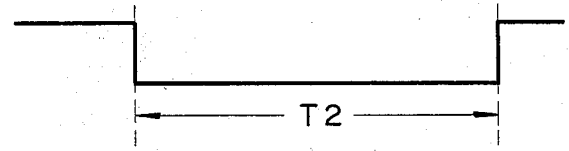

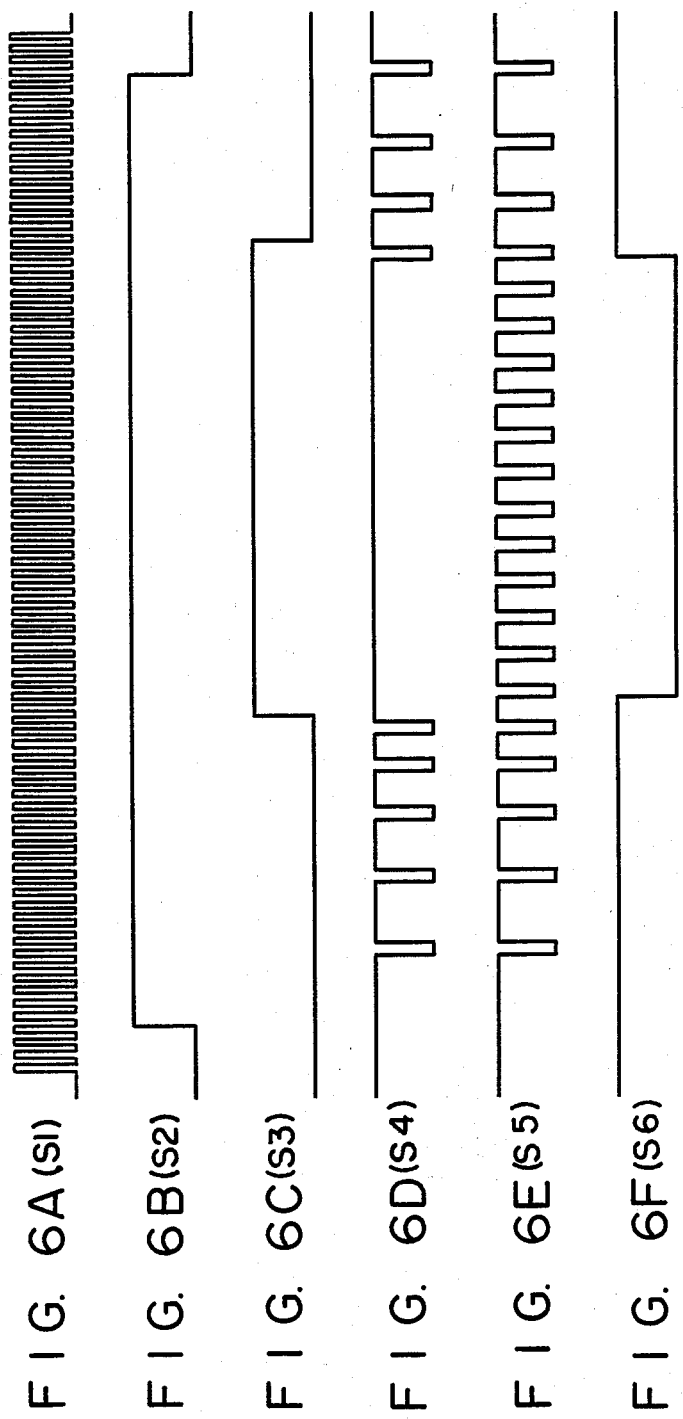

MICROPROCESSOR CONTROLLED PULSE MOTOR

BACKGROUND OF THE INVENTION

The present invention relates to a control device for a pulse motor, and more particularly to a control device containing a microprocessor.

In recent years, pulse motors have been used in a variety of fields. For example, in a dot printer, a pulse motor is used for the paper feed and the carriage movement. In this kind of application, it is common that the pulse motor, together with other driven portions in the dot printer, for example, a print head, be controlled by a microprocessor. The phase data for the pulse motor and dot matrix pattern data for the print head are controlled by the microprocessor.

With regard to the dot printer, there has been a continuous demand to speed up the printing operation. To satisfy this demand, it is necessary that the pulse motor be operable at high speed and at a high frequency in order to minimize vibration of the motor. As described above, the pulse motor and the print head are both under the control of the microprocessor. Therefore, when the motor is speeded up, the data processing of the microprocessor is increased, which adversely influences the control provided by the microprocessor. Further, when the processing speed of the microprocessor cannot follow the high speed operation of the motor, a more sophisticated microprocessor must be used, resulting in an increase in the overall manufacturing cost. Some dot printers require an independent control for the moving speed of the carriage and the printing speed. In this type of printer, the processing program of the microprocessor is complicated, and the use of such a complicated program also prevents the pulse motor from being significantly speeded up.

SUMMARY OF THE INVENTION

Accordingly, an object of the present invention is to provide a control device for a pulse motor containing a microprocessor, which allows the speeding up of the pulse motor without increasing the work (data processing) of the microprocessor.

To achieve the above object, a control device for a pulse motor according to the present invention comprises a microprocessor for executing a program according to an interrupt signal applied to produce time data, a counter circuit having first and second operation modes and producing a pulse signal with a period as defined by the time data, which in a first operation mode supplies an interrupt signal to the microprocessor in synchronism with the pulse signal, and in a second operation mode inhibits the interrupt signal from being supplied to the microprocessor, and a motor control circuit for controlling the rotation of the pulse motor according to the pulse signal.

BRIEF DESCRIPTION OF THE DRAWINGS

FIGS. 3 and 4 are sets of waveforms useful in explaining the operation of the counter section;

FIG. 6 illustrates a set of waveforms of signals in the printer system when a pulse motor is being controlled.

DETAILED DESCRIPTION OF THE PREFERRED EMBODIMENT

Figure 1:
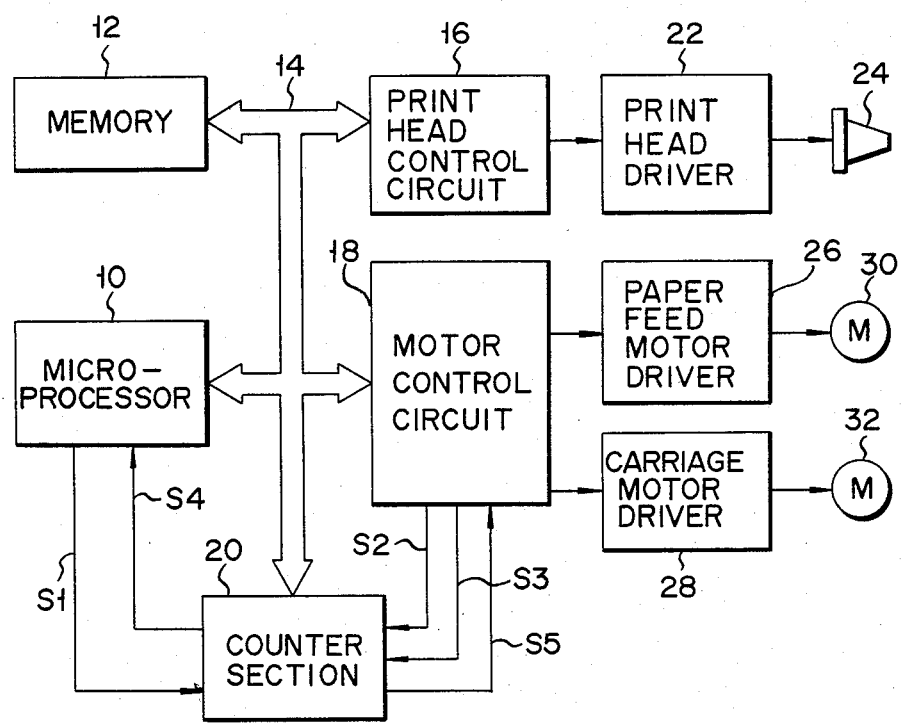
FIG. 1 is a block diagram of an overall printer system containing an embodiment of a control device for a pulse motor according to the present invention.

An embodiment of a pulse motor control circuit according to the present invention will be described referring to the accompanying drawings. In the description to follow, a pulse motor is applied to a dot printer. FIG. 1 shows a configuration of a dot printer system in block form. A microprocessor 10 is provided for controlling a print head and a pulse motor. Programs and data for the microprocessor 10 are stored in a memory 12 connected to the microprocessor 10, through a bus line 14. The bus line 14 is also connected to a print head control circuit 16, a motor control circuit 18, and a counter section 20. The print head control circuit 16 supplies a dot matrix pattern to a print head driver 22 according to the data supplied from the microprocessor 10, thereby controlling the drive of a print head 24. The counter section 20 is provided with two separate programmable counters and is supplied with a clock signal S1 from the microprocessor 10 and trigger signals S2 and S3 from the motor control circuit 18. The counter section 20 supplies an interrupt signal S4 to the microprocessor 10 and a phase exciting data signal S5 to the motor control circuit 18. Pulse motors are provided for the paper feed and the carriage movement, respectively. The motor control circuit 18 produces control signals to a paper feed pulse motor driver 26 and a carriage motor driver 28 and drives a paper feed motor 30 and a carriage motor 32. The motor control circuit 18 controls a rotating angle and a rotating angular speed of each of the pulse motors 30 and 32, according to the period of the phase exciting data signal S5. In the present embodiment, a microprocessor 8085 and an interval timer 8253, both of which are manufactured by Intel Corporation, are used for the microprocessor 10 and the counter section 20, respectively.

Figure 2:
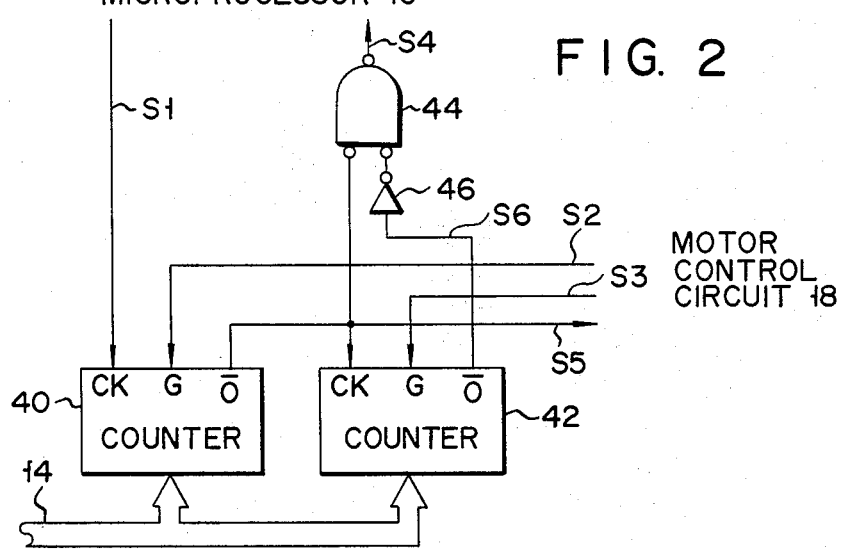
FIG. 2 is a circuit diagram of a counter section in the printer system of FIG. 1.

A practical arrangement of the counter section 20 is illustrated in FIG. 2. The interval timer 8253 has three individual programmable counters, but two of them are used in this embodiment. Each of counters 40 and 42 has many operation modes. The operation modes are controlled by the microprocessor 10 via the bus line 14. In the present embodiment, these counters are set in different modes. The clock signal S1 from the microprocessor 10 is supplied to a clock terminal CK of the counter 40. The trigger signals S2 and S3 from the motor control circuit 18 are applied to gate/trigger terminals G of the counters 40 and 42, respectively. The counters 40 and 42 count down only when their gate/trigger terminals G are logic level "1". The counter 40 counts negative-going pulses of the clock signal, that is, performs the count operation at the falling edge of the clock signal. The counter 42 counts negative-going pulses of the clock signal, that is, performs the count operation at the falling edge of the clock signal. The output signal S5 of the counter 40 is applied to the clock terminal CK of the counter 42, and also to the first input terminal of the OR gate 44, and is applied as a phase data changing signal to the motor control circuit 18. The output signal S6 from the counter 42 is supplied to the second input terminal of the OR gate 44 through an inverter 46. The output signal S4 of the OR gate 44 is applied as an interrupt signal to the interrupt terminal of the microprocessor 10.

The operation of the printer system thus arranged is as follows. The operation of the counters 40 and 42 will first be given referring to timing charts shown in FIGS. 3 and 4. The microprocessor 10 presets via the bus line 14 the data T1 and T2 in the counters 40 and 42, respectively. A clock signal as shown in FIG. 3A is supplied to the clock terminal CK of the counter 40. When the gate/trigger terminal G becomes logic level "1", as shown in FIG. 3B, the counter 40 starts its count-down operation. When its count becomes 0, the counter 40 produces at the output terminal $\overline{O}$ an overflow pulse of logic level "0", as shown in FIG. 3C. The output signal $\overline{O}$ from the counter 40 keeps logic level "1" during the period of the counting operation. The overflow pulse produced from the counter 40 is supplied as a clock signal to the clock terminal CK of the counter 42. The clock signal for the counter 42 is shown in FIG. 4A. The counter 42 starts a count-down operation when its gate/trigger terminal G is logic level "1", as shown in FIG. 4B. The output signal $\overline{O}$ becomes logic level "0" in synchronism with a first clock pulse, as shown in FIG. 4C. Then, the counter 42 counts down the clock pulses and when its count is equal to 0, the output signal $\overline{O}$ becomes logic level "1". In other words, the output signal $\overline{O}$ of the counter 42 is kept at logic level "0" during the operation of the counting operation.

In the dot printer, the printing operation proceeds while the print data is being supplied to the print head and the carriage is being moved at a constant speed. In operation, after the pulse motor has been driven, there is an acceleration period for accelerating the pulse motor. A constant speed period follows the acceleration period. In this constant speed period, the carriage is moved at a constant speed and at this time the printer performs the printing operation. The control of the pulse motor will be described hereinafter. The control of the pulse motor also means the control of the phase exciting data signal S5 supplied to the motor control circuit 18.

Figure 5:
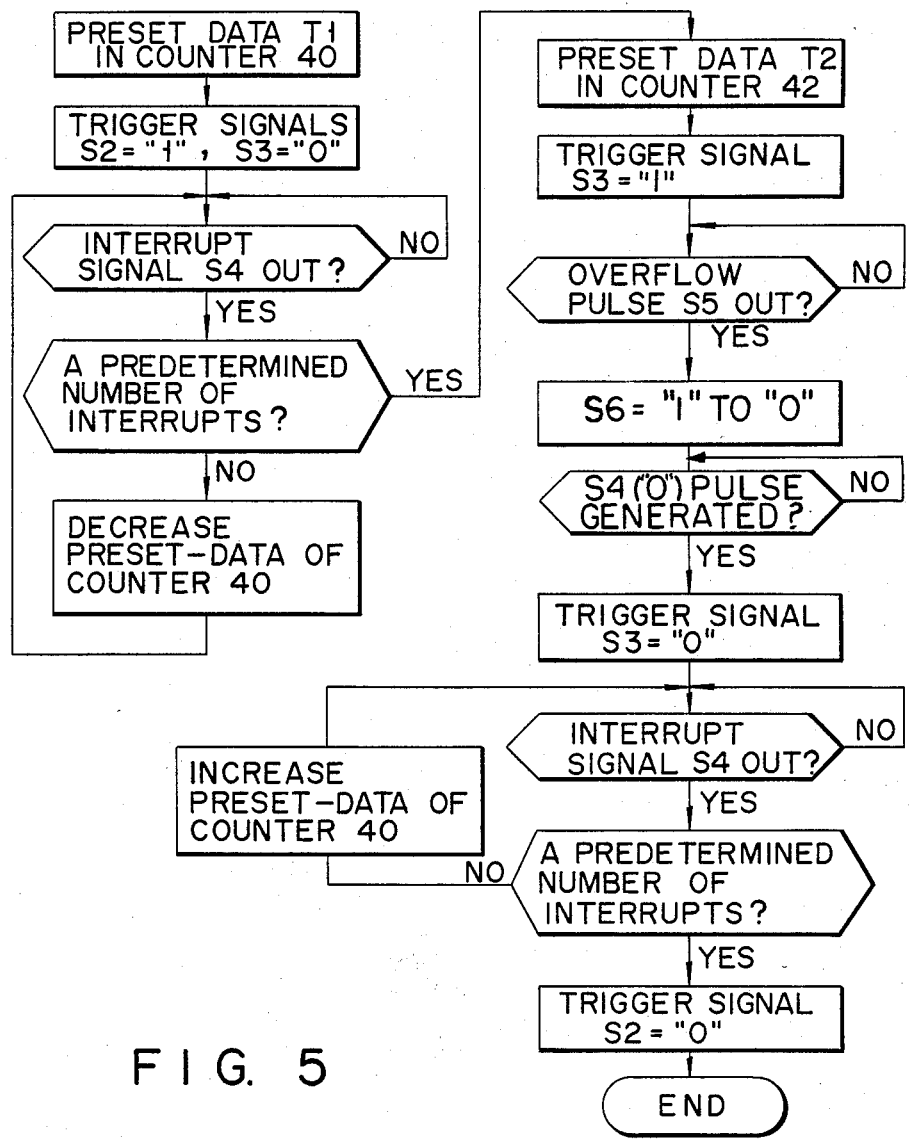
FIG. 5 shows a flow chart illustrating the pulse motor control operation of the printer system.

FIG. 5 shows a flow chart illustrating the operation of the printer system as mentioned above. FIGS. 6A to 6F show timing charts of the respective signals S1 to S6 in the counter section shown in FIG. 2. When a drive command for the pulse motor is supplied to the microprocessor 10, the microprocessor 10 presets the data T1 in the counter 40. After power is supplied the microprocessor 10 produces a clock signal S1 as shown in FIG. 6A, and applies it to the clock terminal CK of the counter 40. For accelerating the pulse motor, only the counter 40 is used and the counter 42 is not used. A trigger signal S2 from the motor control circuit 18 is set at logic level "1", as shown in FIG. 6B. A trigger signal S3 is still logic level "0", as shown in FIG. 6C. The counter 40 starts the count-down operation from the preset value. When the number of clock pulses corresponding to the data T1 are supplied to the counter 40 and the count of the counter 40 reaches 0, its output terminal $\overline{O}$ provides an overflow pulse of logic level "0". The overflow pulse is supplied as the phase exciting data signal S5 to the motor control circuit 18, as shown in FIG. 6E. The phase exciting data signal S5 provides a reference for a rotating angle and a rotating angular speed of the pulse motor. Since the counter 42 has a logic level "0" at the gate/trigger terminal G, as shown in FIG. 6C, if it is supplied with the overflow pulse (FIG. 6E) at the clock terminal CK, it will not operate and the output signal S6 is logic level "1", as shown in FIG. 6F. This signal S6 is supplied to the OR gate 44 through the inverter 46. Therefore, the OR gate 44 allows the overflow pulse (FIG. 6E) to pass directly therethrough. Accordingly, the OR gate 44 supplies the overflow pulse as an interrupt signal S4 to the interrupt terminal of the microprocessor 10, as shown in FIG. 6D. Upon receipt of the interrupt signal S4, the microprocessor 10 judges whether the number of the interrupts has reached a predetermined number. If it has not reached the predetermined number, the microprocessor 10 updates the preset data of the counter 40 and waits for the next interrupt signal. The counter 40 then starts the count-down operation again. When its count becomes equal to 0, the counter 40 produces an overflow pulse, i.e., the phase exciting data signal S5 (FIG. 6E). The preset data in the counter 40 is in proportion to the period of the phase exciting data signal S5. Therefore, as the preset data in the counter 40 is gradually decreased, the period of the phase exciting data signal S5 gradually shortens, so that the rotating speed of the pulse motor increases. For this reason, during the acceleration period of the pulse motor, the preset data of the counter 40 is decrementally updated. Termination of the acceleration period can be judged on the basis of the number of interrupts.

When the acceleration period terminates, a constant speed routine starts. In this routine, both the counters 40 and 42 are used. The operation of the counter 40 is substantially the same as that in the acceleration period, except that the preset data in the counter 40 is not updated depending on the interrupts. Thus, the output signal of the counter 40, i.e., the phase exciting data signal S5, has a fixed period, as shown in FIG. 6E. The pulse motor is rotated at a constant speed. A predetermined data is preset in the counter 42 by the microprocessor 10. The trigger signal S3 is set at logic level "1", as shown in FIG. 6C, and the counter 42 starts to count down and to produce the output signal S6 of logic level "0", as shown in FIG. 6F. Since the output signal S6 is supplied to the OR gate 44 through the inverter 46, the output signal of the OR gate 44, i.e., the interrupt signal S4, is at logic level "1", as shown in FIG. 6D, irrespective of the output signal S5 from the counter 40. This indicates that the output signal from the counter 42 prohibits the interrupt signal from being supplied to the microprocessor 10. Therefore, the work of the microprocessor 10 is lessened, thus allowing the microprocessor 10 to be used for other data processing. Since the pulse motor is controlled only by the counters 40 and 42, if the preset value of the counter 40 is decreased, the rotating speed of the pulse motor can be considerably increased. Further, since the work (data processing) of the microprocessor 10 is lessened, it can easily control a printer of the special type which requires an independent control for the moving speed of the carriage and the operating period of the print head.

The interrupt prohibiting period, which is equal to the operating period of the counter 42, is determined depending on the preset data of the counter 42. For this reason, it is sufficient that the preset data in the counter 42 be determined on the basis of the constant speed period.

When the count of the counter 42 is 0, the output signal S6 becomes logic level "1", as shown in FIG. 6F. The OR gate 44 again allows the overflow pulse S5 to pass therethrough. When the constant speed period terminates, the trigger signal S3 becomes logic level "0", as shown in FIG. 6C, to stop the operation of the counter 42. When the output signal S5 from the counter 42 is supplied as an interrupt signal S4 to the microprocessor 10 through the OR gate 44, the microprocessor 10 updates the preset data of the counter 40. If it incrementally updates the preset data, the rotating speed of the pulse motor is also gradually decreased. As in the acceleration period, the termination of the deceleration period in which the rotating speed is decreased is judged using the number of interrupts. When the deceleration period terminates, the trigger signal S2 is set to logic level "0", as shown in FIG. 6B, and the operation of the counter 40 stops. As a result, the outputting of the phase exciting data signal S5 stops and the pulse motor stops.

In the above description, during the constant speed period of the pulse motor, in order to use the microprocessor 10 only for controlling the printing operation, the pulse motor is controlled only by the counter. There is a case where the carriage is moved at a constant speed without performing the printing operation, such as a return of the carriage to a home position when the power is turned on. In such a case, only the control of the pulse motor is performed, and hence, the application of the interrupt to the microprocessor is allowed. In other words, an interrupt signal may also be supplied to the microprocessor in a constant speed drive mode of the pulse motor without operating the counter 42. At this time the microprocessor, even if it is receiving the interrupt, does not update the preset data of the counter 40.

As seen from the foregoing description, according to the present invention, in a pulse motor control device of the type in which a microprocessor determines the period of the phase data of a pulse motor for every input of an interrupt in the constant speed control mode of the pulse motor, the application of the interrupt to the microprocessor is inhibited. The phase data to the pulse motor is prepared by a pulse signal with a fixed period derived from the counter. With this arrangement, the data processing work of the microprocessor may be decreased. Thus, control of the pulse motor by either the microprocessor or the counter may properly be selected as required. Control by the counter enables the pulse motor to be easily speeded up.

It should be understood that the present invention is not limited to the above-mentioned embodiment. The arrangement of the counter section (FIG. 1) and the like may be replaced by any other suitable components, provided they have the same functions. Further, the control unit of the invention is applicable not only for a dot printer but also for any other devices which include components driven at a constant speed by a pulse motor.

What is claimed is:

1. A microprocessor controlled pulse motor comprising:
a microprocessor having first and second operation modes, the first operation mode executing a program according to an applied interrupt signal and for producing time data according to the program executed, and the second operation mode producing no output, the periods of the first and second operation modes being determined by the microprocessor;
counter means for producing a pulse signal having a period which is varied according to the time data in the first operation mode and which is constant in the second operation mode which in the first operation mode supplies an interrupt signal to said microprocessor in synchronism with production of said pulse signal, and which in the second operation mode inhibits said interrupt signal from being supplied to said microprocessor; and
motor control means for controlling the rotation of the pulse motor according to said pulse signal.

2. A pulse motor control device according to claim 1, in which the time data produced by said microprocessor is preset in said counter means, and said counter means is counted down and produces an overflow pulse when the count reaches 0.

3. A pulse motor control device according to claim 2, in which said microprocessor produces time data which is gradually increased in an acceleration mode of the pulse motor and gradually decreased in a deceleration mode.

4. A pulse motor control device according to claim 3, in which said counter means is set in a first operation mode at the time of acceleration and deceleration of the pulse motor, and is set in a second operation mode during the course of the constant speed control of the pulse motor.

5. A pulse motor control device according to claim 4, in which said counter means has first and second counters in which the time data produced by said microprocessor is stored, in which said first counter counts down at the time of acceleration and deceleration of the pulse motor, and, when its count reaches 0, produces an overflow pulse, and said second counter counts down during the course of the constant speed control of the pulse motor while producing an operation signal, the overflow pulse derived from said first counter is supplied to said motor control means and also to an interrupt terminal of said microprocessor through a gate disabled by the operation signal produced from said second counter.

6. A pulse motor control device according to claim 5, in which the preset time data in said first counter is increased and decreased for every overflow during the acceleration and deceleration of the pulse motor, while being kept at a constant value during the course of the constant speed control of the pulse motor.

* * * * *